(12) United States Patent
van de Loo (10) Patent No.: US 6,838,781 B2
(45) Date of Patent: Jan. 4, 2005

(54) CONTROL SYSTEM FOR A COGENERATION UNIT

(75) Inventor: Paul van de Loo, Norton Summit (AU)

(73) Assignee: Cogen Microsystems PTY LTD, Thebarton (AU)

( * ) Notice: Subject to any disclaimer, the term of this patent is extended or adjusted under 35 U.S.C. 154(b) by 0 days.

(21) Appl. No.: 10/677,256

(22) Filed: Oct. 3, 2003

(65) Prior Publication Data

US 2004/0124638 A1 Jul. 1, 2004

Related U.S. Application Data

(63) Continuation of application No. PCT/AU02/00391, filed on Mar. 28, 2002.

(30) Foreign Application Priority Data

Apr. 4, 2001 (AU) .............................. PR4189

(51) Int. Cl.⁷ ............................................... H02P 9/04
(52) U.S. Cl. ................... 290/40 B; 290/52; 290/40 C; 60/39.03
(58) Field of Search ........................ 290/1 A, 2, 40 R, 290/40 C, 40 B; 60/39.2, 39.3

(56) References Cited

U.S. PATENT DOCUMENTS

| | | | | |
|---|---|---|---|---|
| 4,031,404 A | * | 6/1977 | Martz et al. ............... | 290/40 R |
| 4,220,869 A | * | 9/1980 | Uram ........................ | 290/40 R |
| 4,527,071 A | | 7/1985 | Ausiello ..................... | 290/4 R |
| 4,648,242 A | | 3/1987 | Griesinger ................. | 60/39.03 |
| 4,687,946 A | * | 8/1987 | Jones ........................ | 290/40 R |
| 4,719,361 A | * | 1/1988 | Brubaker ..................... | 290/45 |
| 4,752,697 A | * | 6/1988 | Lyons et al. .................. | 290/2 |
| 5,301,499 A | * | 4/1994 | Kure-Jensen et al. ......... | 60/773 |
| 5,539,258 A | | 7/1996 | Sutton et al. ............. | 290/40 R |
| 5,552,640 A | | 9/1996 | Sutton et al. ............. | 290/40 B |
| 5,751,069 A | | 5/1998 | Rajashekara et al. ..... | 290/40 C |
| 5,949,146 A | * | 9/1999 | VandenBerghe .......... | 290/40 R |
| 6,164,057 A | * | 12/2000 | Rowen et al. ............. | 60/39.27 |
| 6,274,941 B1 | | 8/2001 | Ryhiner .................... | 290/40 A |

FOREIGN PATENT DOCUMENTS

WO    WO97/02454    1/1997

* cited by examiner

Primary Examiner—Nicholas Ponomarenko
(74) Attorney, Agent, or Firm—Burns, Doane, Swecker & Mathis, L.L.P.

(57) ABSTRACT

A control system for a cogeneration unit, the cogeneration unit including a heat engine and an alternator, driven by the heat engine, which generates AC electricity for an electrical load. The control system includes a parameter sensing means for sensing one or more parameters, and providing a sensed parameter value for each sensed parameter. For each sensed parameter, a comparator means compares the sensed parameter value with a respective desired value and provides an error signal according to the difference between the sensed parameter value and the desired value. One or more controlling means use the one or more of the error signals to provide a plurality of control signals, such that each control signal is able to regulate one or more of the controlling characteristics of the alternator and a temperature of a body heated using energy from the cogeneration unit.

42 Claims, 2 Drawing Sheets

CONTROL SYSTEM FOR A COGENERATION UNIT

CROSS-REFERENCE TO RELATED APPLICATIONS

This is a continuation of International Application No. PCT/AU02/00391, with an international filing date of Mar. 28, 2002, designating the United States, claiming the priority of Australian Application No. PR 4189, filed Apr. 4, 2001, and published in English by the International Bureau on Oct. 17, 2002, as WO 02/082631. Priority of the above-mentioned applications is claimed and each of the above-mentioned applications are hereby incorporated by reference in their entirety.

FIELD OF THE INVENTION

This invention relates to cogeneration systems, and particularly to controlling a cogeneration unit that may be connected to a mains power distribution network.

BACKGROUND TO THE INVENTION

Currently, most electricity is generated by large power stations using fuel such as natural gas or coal. In this traditional method of electricity generation, approximately one third of the energy from the fuel is converted to electricity, while approximately two thirds is converted into heat. This heat energy, while potentially useful, is difficult to sell to consumers, as this heat is difficult to transport and potential users are generally some distance away. The heat generated is thus often not used and is surrendered to the atmosphere through cooling towers or through cooling water from the sea.

At the same time, potential users of heat including factories, hospitals and heated swimming pools often then generate their own heat by burning more fuel or by the use of electricity. This is clearly a highly inefficient method of generating heat and electricity and it has been found that it is far more cost effective and efficient for such users to install their own small "power stations", such that they can use the waste heat generated from the electricity generating process directly, to meet their own heating requirements.

The simultaneous production of usable heat and electricity in the same plant is known as cogeneration. Cogeneration units are used in many of the industrial applications described above. However, the concept is equally applicable to domestic environments, such as households that require heating for hot water, and also for general heating of the environment, particularly in colder climates.

The benefits of cogeneration for domestic or household use can be enhanced if surplus electricity generated from such units can be provided to the mains distribution network for use by other households or commercial users.

Furthermore, mains connection allows power for peak household loads to be drawn from the mains distribution network. The cogeneration unit then does not need to be sized to meet these peak loads. A number of methods have previously been proposed to achieve this. However, current methods are generally very expensive and are rather complex to design and install.

The expense and complexity of such systems may be attributed to an inverter, which, is often used with small scale power generators to provide a convenient interface to the mains distribution network. In systems of this type, AC electricity generated by an alternator is rectified to DC and fed into the inverter. The inverter synthesizes AC power which exactly matches mains parameters (for example, frequency and voltage) and at the desired power factor. An inverter of this type typically senses the mains parameters and synthesizes the AC power to suit.

It is an aim of the present invention to provide a control system for use with a cogeneration unit that can be connected to a mains power distribution network in a more simple and cost effective manner.

It is also an aim of the present invention to provide a control system for use with a cogeneration unit, which unit is able to operate independently of an external AC power source (such as, the mains supply from a mains power distribution network).

SUMMARY OF THE INVENTION

In broad terms, the present invention is directed to a system for, and method of, controlling a cogeneration unit, the control system enabling the cogeneration unit to generate AC electricity for an electrical load, the AC electricity having parameters which have been established without the use of an inverter.

The present invention therefore provides a control system for a cogeneration unit, the cogeneration unit including a heat engine and an alternator driven by the heat engine, the alternator generating AC electricity for an electrical load, the control system including.

a. parameter sensing means for sensing plural parameters, said plural parameters including designated parameters of the generated AC electricity, the parameter sensing means providing a sensed parameter value for each sensed parameter;

b. for each sensed parameter, a comparator means for comparing the sensed parameter value with a respective desired value, each comparator means being able to provide an error signal according to the difference between the sensed parameter value and the desired value; and c. one or more controlling means, the one or more controlling means being capable of using one or more of the error signals to provide a plurality of control signals, such that each control signal is able to regulate one or more of the sensed parameters;

wherein the regulation of the sensed parameters is performed by controlling characteristics of the alternator and a temperature of a body heated using energy from the cogeneration unit.

The present invention also provides a control system for a cogeneration unit, the cogeneration unit including a heat engine and an alternator driven by the heat engine, the alternator generating AC electricity for an electrical load, the control system including:

a. parameter sensing means for sensing:
  i. designated parameter(s) of the generated AC electricity; and
  ii. the temperature of a body heated by energy provided by the cogeneration unit;
  the parameter sensing means providing a sensed parameter value for each sensed parameter;

b. for each sensed parameter, a comparator means for comparing a sensed parameter value with a respective desired value, each comparator means being able to provide an error signal according to the difference between the sensed parameter value and the desired value; and c. each comparator means being coupled to a respective controlling means, each controlling means being capable of using the error signal from the comparator means to provide a control signal, such that each control signal can be used to regulate a respective parameter;

wherein the regulation of the designated parameters is performed by controlling characteristics of the alternator, and the regulation of the temperature of the body is performed by controlling fuel supply to the heat engine.

The present invention is able to provide AC electricity to an electrical load either in conjunction with AC electricity obtained from an external power source (for example, a mains power distribution network) or independently of an external power source. Thus, the present invention is capable of at least two modes of operation, namely, a mains-connected mode or a stand-alone mode. In this form of the invention, the designated parameters are mode dependent.

More specifically, in the stand-alone mode the designated parameters are preferably the output voltage and frequency of the AC electricity generated by the alternator. In this mode, the present invention is able to regulate these parameters so as to compensate for variations in the magnitude of a component of the electrical load, thus minimizing large fluctuations in voltage and frequency which may otherwise result. In this respect, the component of the electrical load may be a household load.

In the mains-connected mode the designated parameter is preferably the power factor of the AC electricity generated by the alternator.

It will thus be recognized that the present invention also provides a multi-mode control system for a cogeneration unit, the cogeneration unit including a heat engine and an alternator driven by the heat engine, the alternator generating AC electricity for an electrical load, the control system including:

a. parameter sensing means for sensing:
  i. designated parameter(s) of the generated AC electricity; and
  ii. the temperature of a body heated by energy provided by the cogeneration unit;
  the parameter sensing means providing a sensed parameter value for each sensed parameter, the designated parameters being mode dependent such that in a first mode the designated parameters include the voltage and frequency of the AC electricity and in a second mode the designated parameters include the power factor of the AC electricity;

b. for each sensed parameter, a comparator means for comparing a sensed 15 parameter value with a respective desired value, each comparator means being able to provide an error signal according to the difference between the sensed parameter value and the desired value; and c. each comparator being coupled to a respective controlling means, each controlling means using the error signal from the comparator to provide a control signal, each control signal being used to regulate a respective parameter;

wherein the regulation of the designated parameters is performed by controlling characteristics of the alternator, and the regulation of the temperature of the body is performed by controlling fuel supply to the heat engine and wherein the mode of the control system is selectable using a switch.

In a preferred form of the present invention the temperature of the body is sensed using a transducer. The body may be a body of water which is stored in a storage tank, the water being heated at least by waste heat obtained from the heat engine.

In another embodiment of the invention, the body may be a body of air heated by energy derived from a source (for example, the body of water mentioned earlier) which obtains energy from the cogeneration unit.

In yet another embodiment of the invention, the body may be water in a hydronic heating water flow circuit.

The controlling means for controlling the temperature of the body preferably includes a fuel control means which is able to provide a fuel control signal which varies according to a temperature error signal from the comparator means associated with the transducer. The fuel control signal is preferably fed to a fuel regulator which is responsive to the fuel control signal to regulate the fuel supply to the heat engine according to the fuel control signal.

In the preferred form of the invention, the heat engine is a steam engine that includes a gas burner. In this form of the invention, the fuel regulator is a gas regulator that provides a gas supply to the gas burner. In another form of the invention, the heat engine may be an internal combustion engine (for example, a diesel engine) which is suitable for use with the present invention.

In a preferred embodiment of the invention the control system may be implemented using a programmed computer. Thus the present invention also provides a programmed computer for controlling a cogeneration unit, the cogeneration unit including a heat engine and an alternator driven by the heat engine, the alternator generating AC electricity for an electrical load, the programmed computer including software and hardware for:

a. sensing parameters, the parameters including:
  i. designated parameter(s) of the generated AC electricity; and
  ii. the temperature of a body heated by energy provided by the cogeneration unit;
  such that the sensing provides a sensed parameter value for each sensed parameter;

b. comparing a sensed parameter value with a respective desired value, the comparison providing an error signal according to the difference between the sensed parameter value and the desired value; and c. using each error signal to provide a respective control signal, such that each control signal can be used to regulate a respective parameter;

wherein the regulation of the designated parameters is performed by controlling characteristics of the alternator, and the regulation of the temperature of the body is performed by controlling fuel supply to the heat engine.

It will also be recognized that the present invention also provides a method for controlling a cogeneration unit, the cogeneration unit including a heat engine and an alternator driven by the heat engine, the alternator generating AC electricity for an electrical load, the control system including:

a. sensing plural parameters, said plural parameters including designated parameters of the generated AC electricity, the sensing providing a sensed parameter value for each sensed parameter;

b. comparing a sensed parameter value with a respective desired value;

c. providing an error signal according to the difference between the sensed parameter value and the desired value; and d. using one or more of the error signals to provide at least one control signal, such that each control signal is able to regulate one or more of the sensed parameters;

wherein the regulation of the sensed parameters is performed by controlling characteristics of the alternator and a temperature of a body heated using energy from the cogeneration unit.

It will also be recognized that the present invention also provides a method for controlling a cogeneration unit, the cogeneration unit including a heat engine and an alternator driven by the heat engine, the alternator generating AC electricity for an electrical load, the method including:

a. sensing parameters, the parameters including:
   i. designated parameter(s) of the generated AC electricity; and
   ii the temperature of a body heated by energy provided by the cogeneration unit;
   such that the sensing provides a sensed parameter value for each sensed parameter;
b. comparing a sensed parameter value with a respective desired value, the comparison providing an error signal according to the difference between the sensed parameter value and the desired value; and
c. using the error signal from the comparator means to provide a control signal, such that each control signal being can used to regulate a respective parameter;

wherein the regulation of the designated parameters is performed by controlling characteristics of the alternator, and the regulation of the temperature of the body is performed by controlling fuel supply to the heat engine.

GENERAL DESCRIPTION OF THE INVENTION

Ideally, the alternator of the present invention is a hybrid alternator. As will be appreciated, a hybrid alternator includes a rotor having a field winding which is able to be magnetized by a direct current (herein referred to as the 'field current'), a permanent magnet, and a stator having a stator winding, such that when the rotor is driven by the heat engine, a rotating magnetic flux produced by combination of the magnetization of the field winding and the permanent magnet induces a voltage (Emf) in the stator winding.

The alternator should be of sufficiently large capacity such that the torque angle (that is, the angle between rotor field and stator field) in operation does not get too large, otherwise it may be difficult to achieve and/or maintain synchronism between the alternator and the mains as is required in a mains-connected mode (for example, if the torque angle exceeds 90 degrees then synchronism will be lost).

In this respect, although reference will be made to the alternator in terms of a hybrid alternator, it is to be appreciated that in another embodiment of the invention a conventional alternator may be used.

Furthermore, although the alternator will be described in terms of an alternator having a single phase output (which is well suited to households use) it should be understood that the control system of the present invention is equally applicable to three phase electricity production and three phase connection to the mains.

Finally, although the alternator referred to in this description is a synchronous alternator, other types of alternator may be used with the suitable modifications to adapt for their characteristics.

As mentioned earlier, pursuant to a preferred form of the present invention, the control system (and therefore, the cogeneration unit) is able to operate in one of at least two modes. In this preferred form, the control system further includes a multi-pole changeover switch that is operable to selectively switch the control system into either the stand-alone mode or the mains-connected mode. In one form of the invention, the multi-pole changeover switch may be a physical switch. In an alternative form of the invention, the multi-pole changeover switch may be implemented using a programmed computer (for example, using software in a micro computer).

Having to this point described the two modes in quite broad terms, the description will now endeavor to describe these modes in more detail.

Stand-alone Mode Operation

In stand-alone mode, the changeover switch is set to configure the control system for enabling the alternator to generate AC electricity without relying on an external AC power source (for example, AC power derived from a mains power distribution network).

In this mode, as mentioned previously, the designated parameters that are sensed by the control system preferably include the output voltage (V) and frequency (f) of the generated AC electricity. As will be explained in more detail later, the control of the output voltage is performed by controlling the current in the field winding of the alternator, whereas the control of the frequency is performed by controlling the speed of the alternator.

In this form of the invention, at least two comparator means are provided. A first comparator means is preferably provided for comparing the sensed output voltage with a respective desired voltage value (that is, $V_{des}$), and a second comparator means is preferably provided for comparing the sensed frequency with a respective desired frequency value (that is, $f_{des}$).

The first comparator means preferably provides a voltage error signal according to the difference between the sensed output voltage and the respective desired voltage value. In this form of the invention, the voltage error signal is preferably used by an output voltage controlling means to vary the field current ($I_f$) in the field winding of the alternator. As will be appreciated, varying the field current proportionally varies the electromotive force (Emf) which is coupled into the stator, thus regulating the output voltage. Thus, in this mode of the present invention, the characteristic of the alternator which is controlled to regulate the output voltage is the field current.

The second comparator means preferably provides a frequency error signal according to the difference between the sensed frequency and the respective desired frequency value. Here then, the frequency error signal is preferably used by a frequency controlling means to control an electronic switch (or regulator) so as to effectively vary the magnitude of an 'dummy' load connected to the alternator output.

In a preferred form of the invention, the effective magnitude of the dummy load is varied by switchably connecting the dummy load to the output of the alternator at a controllable switching rate. In this respect, reference to the term 'effective dummy load' throughout this specification is to be understood to be reference to the average value of the dummy load as 'seen' by the alternator output.

As will be appreciated, varying the effective magnitude of the dummy load connected to the alternator output correspondingly varies a mechanical load on the rotor of the alternator, which variation is realized as a change in the torque load of the heat engine. Variation of the torque load of the heat engine correspondingly varies the angular velocity of the rotor, which in turn regulates the frequency of the AC electricity. Thus, in this mode of the present invention, the characteristic of the alternator which is controlled to regulate the frequency is the torque load.

In the preferred form of the invention, the electronic switch is a triac that is switched using a control signal derived from the controlling means associated with the second comparator to switchably connect the dummy load to the output of the alternator.

The dummy load is preferably a resistive load. More specifically, the resistive loads may be a heating element located in a water tank such that heat generated by the dissipation of power in the resistive load contributed to the heating of water in the water tank. Thus, in this form of the invention, both the waste heat of the heat engine and heat generated by the resistive load heat the water.

Advantageously, in this form of the invention, where the AC electricity generated by the alternator is provided to an electrical load which includes the resistive load and a household load, the resistive load is preferably used to dissipate excess power (that is the difference between the total power generated by the alternator, and the power requirements of the household load) as well as compensate for fluctuations the household load requirements by providing a 'buffer' load which is able to be manipulated to maintain a substantially constant total electrical load (that is, the resistive load combined with the household load). Ideally, such manipulation is able to be performed 'quickly' (that is, with one, or a few, cycles of the alternator output), whereas the response of the heat engine to a changed fuel supply rate will typically be slower. Indeed, the response of the heat engine to a changed fuel supply rate may be too slow to avoid substantial frequency fluctuations on household load switching.

As will be appreciated, increasing the power dissipated by the resistive load, tends to increase the temperature of the body of water.

The temperature of the body of water is sensed by the transducer and the resultant sensed signal is fed to a third comparator which is able to generate the temperature error signal according to the difference between the sensed temperature and the desired temperature value.

The temperature error signal is fed to the fuel control means which responds to the increase in water temperature by acting to control the fuel regulator so as to decrease the supply of fuel to the heat engine. The decrease in supply of fuel to the heat engine correspondingly reduces the frequency of the alternator output.

The decrease in frequency is sensed by the frequency sensing means and consequently, the effective magnitude of the resistive load is reduced to compensate for the decrease in frequency according to the method described earlier.

The decrease in the effective magnitude of the resistive load may inhibit the ability of the control system to respond to 'switch on' transients which may be caused by fluctuations in the household load. That is, where once the effective magnitude of the resistive load may have been sufficient to be used as a 'buffer' to accommodate fluctuations in the household load, in the situation just described the resistive load may not be large enough to enable it to be used to compensate for such fluctuations.

Advantageously, the present invention overcomes the above-mentioned problem by providing a mode (herein referred to as the 'electrical priority mode') which provides the control system with the ability to maintain supply of AC electricity suitable for the household load in circumstances where the temperature of the body would otherwise result in the AC electricity being unsuitable (for example, the frequency being too low).

In electrical priority mode, the fuel supply to the heat engine may be fixed to a predetermined supply rate (for example, a maximum supply rate), or may be varied so as to maintain a fixed buffer over the household load.

Electrical priority mode may be selected/deselected by a user using a switch, or perhaps by way of a menu selection on a user interface. The selection/deselection may be communicated to the controller.

In an alternative form of the invention, a "smart" controller may be used. In this form, the smart controller may be able to switch the control system to electrical priority mode based on a prediction that the household load is about to increase. Such a prediction may be based on previous usage patterns, or user selections or other data that may be available to the smart controller.

In a form of the invention which includes a smart controller, the smart controller may also be able to select electrical priority mode when the household requirement approaches the alternator output (that is, when the dummy load heat dissipation has reduced below a predetermined level), then automatically disconnect the electrical priority mode when the buffer has again increased to an appropriate level.

A system of the present invention which is able to support an electrical priority mode may further include the following means:

A. means for disabling temperature/fuel control until a threshold temperature is reached (that is, replace the desired temperature value with a threshold temperature value);

B. same as (A), but also including means for adding an additional heat load either internal to the house or external (wasting it) or both, to delay the time before the threshold temperature is reached, or avoid reaching it; or C. adding a large enough additional internal and/or external heat loads to ensure that maximum heat can always be dissipated at the desired temperature, and maintain control to desired temperature.

In relation to (A) and (B), in these cases the stand-alone electrical priority mode is only operable until the body reaches the threshold temperature, at which point the control system transitions to stand-alone mode operation. In this respect, the threshold temperature may be a maximum allowable temperature which is in excess of the desired temperature value.

In relation to (B) and (C), in this form of the invention, the additional heat load may include a heat dissipation apparatus which is able to extract heat from the body, and thus delay the time which is taken to reach the threshold temperature or prevent the body from reaching the threshold temperature.

In one example of a suitable apparatus, a hydronic heating system which is typically connected to the body may be used. In this arrangement, the hydronic heating system is able to utilize the heated body (for example, water) to provide heating to a household.

In this embodiment of the invention, the control system may further include control means for controlling the hydronic heating system. Such control means may typically be used to control the hydronic heating system so as to increase its heat dissipation (for example, by increasing water flow rate, or increasing valve openings at radiators) so as to enable the cogeneration unit to generate a maximum output power with less chance of the threshold temperature being reached quickly, or at all.

In yet another form of the invention, the electrical priority mode may be the 'default' mode of operation, and heat dissipated by the body whilst in this mode may be released as waste heat. In this form of the invention, the maximum output power (and thus, a full output load capability) is always available. In one arrangement of this form of the invention the waste heat may be released using a cooling tower located outside of the household. Alternatively, where the body is water in a tank, the water may be allowed to boil and vent the steam to outside of the tank.

Having described the first mode of the control system, the description will now turn to the second mode.

Mains Connected Mode Operation

In the second mode ('the mains-connected mode') the changeover switch is configured to enable the alternator to generate AC electricity such that designated parameters of the second mode are controlled using respective parameters of the external AC power source and the temperature of the body is controlled according to a temperature which is sensed by a transducer.

Preferably, the external AC power source is a mains supply obtained from a mains distribution network. In yet another embodiment of the invention, the external AC source may derived from a source which is not a mains power distribution network (for example, a solar powered generator, a wind-turbine generator, or other suitable AC generator).

In the mains-connected mode, the output voltage and the frequency of the alternator output are fixed according to the corresponding parameters of the external AC power source. Here, the impedance of the mains power distribution network as 'seen' by the alternator output is so low relative to the drive capacity of the heat engine that the heat engine and the alternator frequency and voltage will be dictated by the mains supply from the mains power distribution network. Thus, the alternator output voltage is fixed to the voltage of the external AC power source, and the frequency of the alternator output is fixed to the frequency of the external AC power source.

Preferably, the designated parameter which is sensed and regulated by the control system is the power factor of the alternator output (that is, the phase angle between the stator voltage and the stator current). Thus, in this mode of the invention, the sensing of the power factor may entail sensing the phase relationship between the output voltage and the output current.

More specifically, the control system includes a fourth comparator means that is able to compare the sensed power factor with a desired power factor value. Ideally, the fourth comparator means provides a power factor error signal according to the difference between the sensed power factor and the respective desired power factor value. In this form of the invention, the error signal is preferably used by a power factor controlling means to vary the field current ($I_f$) in the field winding of the alternator which in turn regulates the power factor of the alternator output. Thus, in this form of the present invention, the characteristic of the alternator which is controlled to regulate the power factor is the field current.

Advantageously, in this form of the invention, when the household load power requirements are less than the total output power of the alternator, surplus power can be provided to the external AC power source. Indeed, in forms of the invention where the external AC power source is the mains power distribution network, surplus power may be sold to the utility provider.

Mains Connected Mode—Fault Condition Response

Preferably, the present invention includes sufficient functionality to enable the control system to respond to certain fault conditions. In this respect, it is envisaged that in an operational scenario two types of fault conditions may be encountered, namely, heat engine failure and mains power distribution network failure.

In relation to heat engine failure, in the event that the heat engine were to fail whilst the cogeneration unit was operating in mains-connected mode, the application of the mains power to the output of the alternator would result in the alternator behaving as a motor. Such behavior would result in a reversal in the direction of the flow of the current on the output side of the alternator.

Advantageously, in a preferred form of the invention, the parameter sensing means includes a current sensing means which is able to sense the reversal in the direction of the current and in response isolate the alternator from the mains power distribution network.

In an alternative form of the invention, the parameter sensing means may sense the reversal in the direction of the current by sensing the power factor of the alternator output. Advantageously, it is envisaged that power factor sensing may be useful in relation to the detection of other fault conditions (for example, synchronization errors).

In relation to failure of the mains power distribution network, here the control system preferably senses the loss of mains supply (that is, the voltage and frequency of the supply from the mains power distribution network) and in response acts to transfer the operation of the control system to the stand-alone mode. Thus, provided that the power requirements of the household load are less than the output power of the alternator, the supply of AC electricity to the household load will be uninterrupted.

It will thus be recognized that the present invention provides a system and method for generating AC electricity which is suitable for use with a mains power distribution network without relying on an intermediate DC conversion process. Thus, the present invention is able to provide AC electricity without relying on an inverter.

It will also be recognized that the present invention provides a system and method for generating AC electricity which is suitable for use without a mains power distribution network and which is able to compensate for fluctuations in an electrical load.

BRIEF DESCRIPTION OF THE DRAWINGS

The preferred embodiment of the present invention will now be described in detail with reference to the following figures in which.

DETAILED DESCRIPTION OF THE PREFERRED EMBODIMENT

Figure 1:
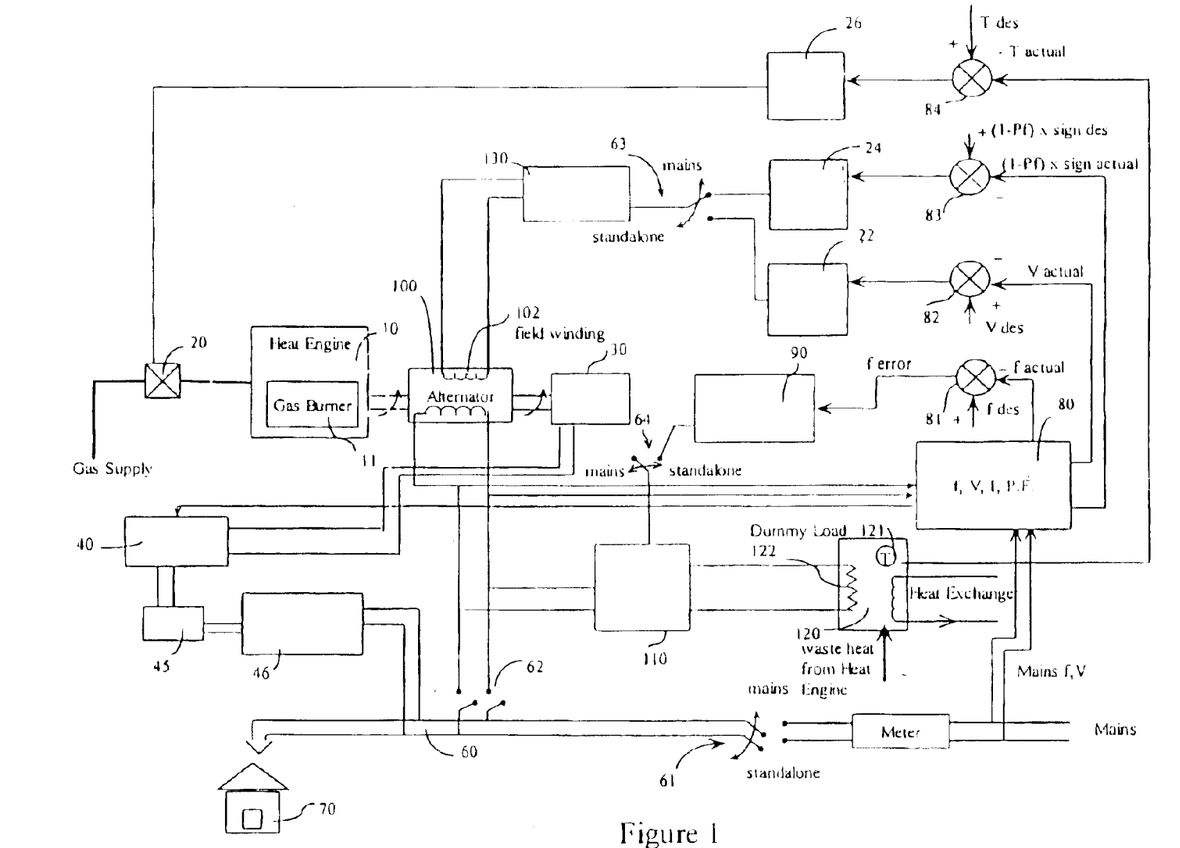
FIG. 1 is a schematic diagram of the control system of the present invention.

Referring to FIG. 1, the preferred embodiment of the present invention includes a heat engine 10 which is coupled to an alternator 100, the heat engine 10 providing a motive force for driving the alternator 100, which in the preferred embodiment of the invention is a hybrid alternator.

In the embodiment illustrated and described, the heat engine 10 is also coupled to a DC motor 30 which is able to be used to start the cogeneration unit in a way which will be described in more detail later.

In the preferred embodiment, the heat engine 10 is a steam engine having an arrangement which includes a burner 11 suitable for burning gas for the purpose of generating heat for converting water into steam so as to provide mechanical power for driving the rotor of the alternator 100.

The gas is routed to the heat engine via a fuel regulator 20 which is able to be controlled by a fuel controller 26 which may be a analogue or digital based controller (for example, a micro computer).

A sensing means 80 provides the control system with the requisite functionality to sense the designated parameters of the AC electricity generated by the alternator and provide sensed parameter values.

The designated parameters are dependent upon the mode of operation of the control system. In this respect, the preferred embodiment of the present invention may be used in at least two modes. The first mode is the stand-alone mode, in which the cogeneration unit operates in isolation of the mains power distribution network. The second mode is the mains-connected mode, in which the unit is connected to the mains power distribution network and operated in conjunction therewith.

In the first mode, the parameter sensing means 80 is preferably able to sense the voltage (V) and frequency (f) of the alternator output whereas in the second mode the parameter sensing means is able to sense the power factor (by sensing the phase relationship between the output voltage and the output current) of the alternator output.

In the preferred embodiment, the current is sensed by sensing the voltage across a shunt resistor (not shown) and using this sensed voltage to determine the current based on the measured voltage.

As will be appreciated, the voltage is able to be sensed using a voltmeter.

In relation to the power factor, the power factor is computed by the parameter sensing means as the phase difference between the measured output voltage and current.

The nature of the relationship between the modes of the control system and the designated parameters will be explained in more detail later.

The control system includes switches 61, 62, 63 and 64 which are able to be actuated to configure the control system to operate in a particular mode.

In the preferred embodiment of the invention switches 61, 62, 63 and 64 are implemented using software control. More specifically, switches 61 and 62 may each be a physical switch formed using contacts of a relay having a coil (not shown) which is able to be energized and de-energized using a respective software controlled switch (not shown) so as to actuate the respective switches 61, 62.

In this respect, where a microcomputer is used, switches 63 and 64 may be implemented using a software program which incorporates the appropriate functionality (for example, a 'logical' switch) so as to route a respective control signal (that is, the voltage or the power factor control signal in the case of switch 63, and the frequency control signal in the case of switch 64) to the appropriate control system component depending upon the mode of the control system.

The parameter value for each sensed designated parameter are provided to a respective comparator. Thus, the preferred embodiment of the invention 5 includes a frequency comparator 81, a voltage comparator 82 and a power factor comparator 83. Each comparator is able to be connected to a respective controller 90, 24, depending once again on the mode of operation.

In the preferred form of the invention, these controllers, together with the fuel controller 26, may be implemented using a microcomputer.

Indeed, the use of a microcomputer is well suited to the present invention as such an implementation permits the incorporation of other features, such as optional control of a home heating circuit (for example, a hydronic heating system) and/or an external cooling tower. The significance of these elements will be described in more detail later.

Moreover, the use of a microcomputer may also provide other features such as a user interface, system diagnostic, and hour meter function. The implementation of features such as these using software would be well within the capabilities of a software engineer.

Starting the Cogeneration Unit

At initial start up, switches 61, 63, and 64 are positioned in the stand-alone position and switch 62 is switched to an open position. As is evident from inspection of FIG. 1, in this configuration the mains power supply from the mains power distribution network is isolated from the co-generation unit and the alternator 100 output is isolated from the household load 70. Furthermore, the frequency controller 90 preferably initially sets the effective magnitude of the dummy load 122 to a minimum value.

At start up, the fuel regulator is 'opened' to provide gas to the burner 11, and the burner 11 is lit to begin operation of the heat engine 10.

Soon after the burner 11 is lit, the heat engine 10 starts to generate steam. At this stage, a battery 45 is used to rotate a starter motor (in this case, DC motor 30) for a short period of time to start rotation of the heat engine 10. In the preferred embodiment, the operation of the DC motor 30 is controlled by start-up controller 40 which is connected to battery 45 which in turn is connected to battery charger 46. Battery charger 46 is connected directly to power circuit 60.

Once the rotation of the heat engine 10 has been initiated by the DC motor 30, the heat engine 10 then starts to operate using mechanical power generated by the heat engine 10 itself. At this point, the start-up controller disengages the DC motor 30 from the heat engine 10.

During startup, the frequency and voltage of the electricity generated by the alternator 100 are sensed by parameter sensing means 80.

Here then, the desired frequency value ($f_{des}$) and the sensed frequency value ($f_{act}$) are input to comparator 81, while the desired voltage $V_{des}$ and the sensed voltage $V_{act}$ are input to comparator 82.

Comparator 81 and comparator 82 act in response to a difference between the sensed parameter value and a respective desired value to provide a respective error signal to a respective control means such that each control means is able to either directly or indirectly regulate characteristics of the alternator, such that the respective parameters of the output AC electricity generated by alternator 100 are able to achieve the corresponding desired values.

During startup then, as the heat engine 10 increases in speed, the frequency of the alternator 100 output correspondingly varies (that is, increases), thus the error signal generated by comparator 81 also varies.

The variation in the frequency error signal is sensed by frequency controller 90 which gradually increases the effective magnitude of dummy load 122 connected to the output of the alternator 100 (thus providing power to the dummy load 122) until the frequency matches the desired frequency.

In the preferred embodiment of the invention, the gradual increase in the effective magnitude of the dummy load 122 is performed by the frequency controller 90 in association with triac 110. More specifically, the frequency controller 90 controls (using a frequency control signal) the switching operation of triac 110 to gradually increase the dummy load 122 on the output of the alternator 100.

The frequency controller 90 may be any suitable analogue or digital controller which is able to use a frequency control function to generate a frequency control signal according to the frequency error signal.

In this respect, in the preferred embodiment of the invention, the frequency control function may be of the form of:

$$K_7 + K_8/s \quad (1)$$

where $K_7$ is a proportional term and $K_8/s$ an integral term (which is required to avoid a steady state error which would be unacceptable for frequency control). In an alternative embodiment of the invention, a derivative term ($K_9s$) may also be included, in which case the frequency control function will be in the form of:

$$K_7 + K_8/s + K_9s \quad (2)$$

Here, $K_7$ $K_8$ and $K_9$ are negative values, since in order to increase the frequency a decrease in the magnitude of the dummy load is required.

Although the frequency control function has been described in terms of equations (1) and (2) it is to be understood that other frequency control functions which provide a similar result may be used.

The value of the gains ($K_i$) in equations (1) and (2) may be determined using standard optimization procedures according to the type of response required. In this case, a critically damped response is desirable. Such a response provides a faster response, but at the expense of larger overshoots.

In operation, the triac 110 will be switched on for an entire half cycle, for each cycle that is desired to be on. In this way, all switching can be done at zero volts. It is important however that the switching occurs on alternate positive and negative cycles to avoid a DC output.

This triac control methodology may lead to mechanical vibration and stress problems as the frequency of torque fluctuations associated with the triac load switching is relatively low. Thus, an alternative to the above mentioned switching scheme is to use phase angle control of the triac switching, in which the load is switched every half cycle.

Although this results in larger currents being switched, the above-mentioned approach results in smoother control, as the torque fluctuating frequency will be higher.

In relation to the controlling the voltage of the output AC electricity to achieve the desired value, here as the heat engine 'winds up' the voltage error signal is provided to voltage controller 22 which generates a voltage control signal corresponding to the voltage error signal.

The voltage controller 22 may be any suitable analogue or a digital controller which is able to use a voltage control function to generate a voltage control signal according to the voltage error signal.

In this respect, in the preferred embodiment of the invention, the voltage control function may be of the form of:

$$K_1 + K_2/s \quad (3)$$

where $K_1$ is a proportional term and $K_2/s$ is an integral term (used to avoid a steady state error which would be unacceptable for voltage control). In an alternative embodiment of the invention, a derivative term ($K_{2a}s$) may also be included, in which case the voltage control function will be in the form of:

$$K_1 + K_2/s + K_{2a}s \quad (4)$$

Although the voltage control function has been described in terms of equations (3) and (4) it is to be understood that other voltage control functions which provide a similar result may be used.

The value of the gains ($K_i$) in equations (3) and (4) may be determined using standard optimization procedures according to the type of response required.

In this case, a critically damped response is desirable. Such a response provides a faster response, but at the expense of larger overshoots.

The voltage control signal is provided to the field current controller 130 which controls the current in field winding 102 of the alternator (or the equivalent on permanent magnet hybrid alternators) so as to achieve the desired value. As will be appreciated increasing, or decreasing, the current in the field winding correspondingly varies the magnetic flux in the alternator, which in turn correspondingly varies the induced Emf and thus the output voltage.

Although reference has been made to the use of a DC motor 30 to start the heat engine 10, it is to be understood that the present invention need not be so limited. Indeed, in an alternative embodiment of the invention, the alternator 100 is able to operate as a motor, thus obviating the need for a separate starter motor. In this form of the invention, AC current used to rotate the alternator (which in this case is acting as a motor) may be provided by the mains power distribution network (if available) or from a battery via an inverter.

In yet another embodiment of the present invention, the alternator 100 may include a separate additional winding which enables it to function as a DC motor. In this form, the alternator 100 may include suitable mechanical or electronic commutation to provide a steady direction of torque.

Figure 2:
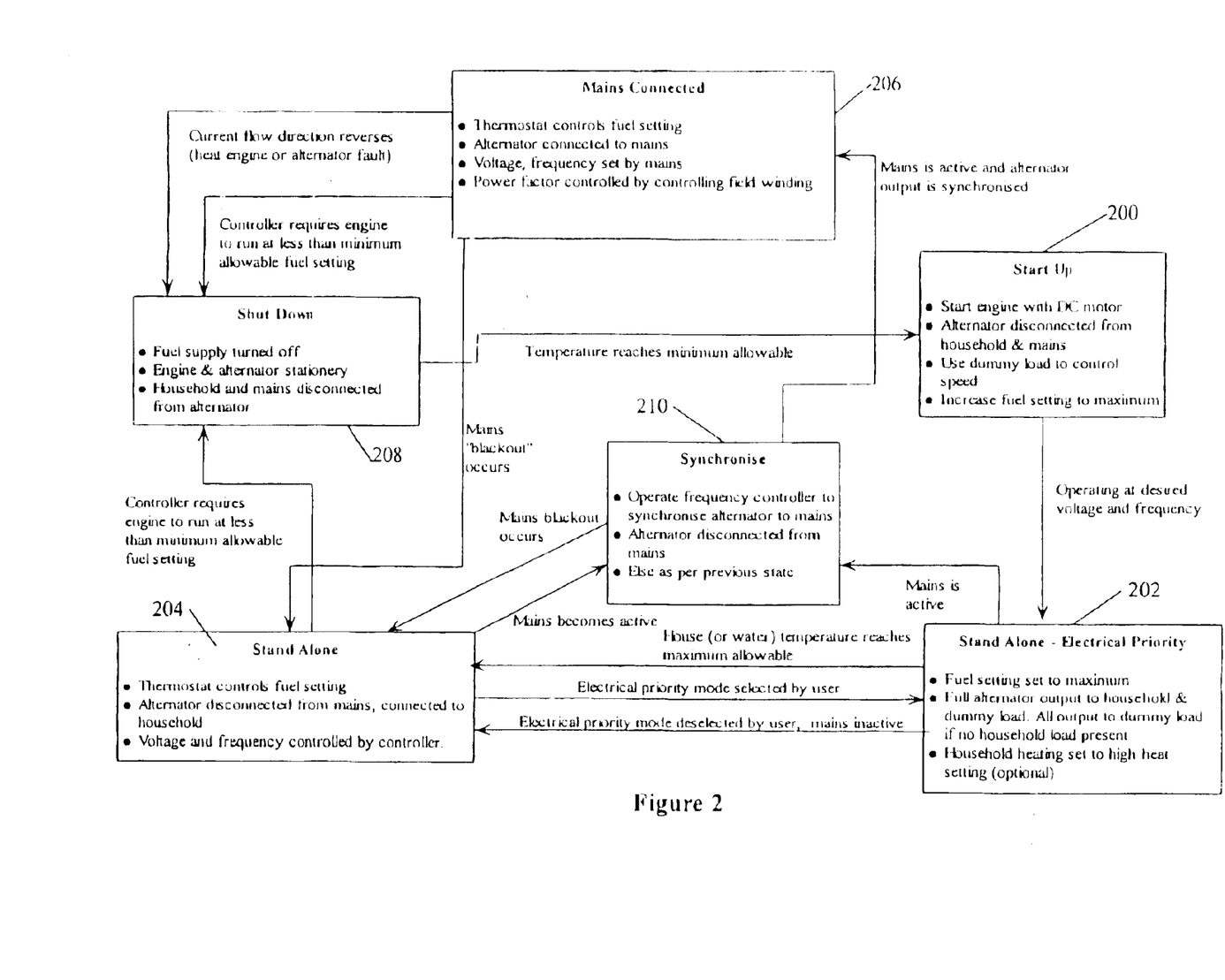
FIG. 2 is a state-mode diagram for the preferred embodiment of FIG. 1.

Turning now to FIG. 2, from startup mode 200, once the alternator is providing AC electricity having the desired frequency and voltage, the control system transitions to a 'stand-alone electrical priority mode' 202.

Stand-alone Electrical Priority Mode

Referring again to FIG. 1, the control system may be configured for stand-alone electrical priority mode by closing switch 62 so as to provide the alternator electricity to the household load 70 in adidtion to the dummy load 122, or alternatively, the output power may be routed to the dummy load 122 alone (as was the case during the start up).

In mode stand-alone electrical priority mode, the gas supply to the burner 11 is maintained at the maximum supply rate. Here, fuel controller 26 is configured so as to not be responsive to the temperature error signal generated by comparator 84 in relation to the desired temperature value.

Instead, a threshold temperature value is used in place of the desired temperature value, and the fuel controller 26 is disabled until the threshold temperature is reached.

Since, field current controller 130 is still responsive to the voltage error signal, and frequency controller 90 is still responsive to the frequency error signal, the alternator output voltage and frequency are regulated according to the method described earlier.

Once the water temperature attains the threshold temperature the control system may be configured to operate in stand-alone mode 204 (refer FIG. 2). As mentioned previously, such transition may be affected by the control system controlling a heat dissipation apparatus which is connected to the body (such as a hydronic heating system) and which is suitably arranged to maximize heat loss inside and/or outside a household so as to avoid, or postpone, the threshold temperature from being reached.

Indeed, in one form of the invention the heat dissipation apparatus may provide a heat load which is sufficiently large so as to not require the replacement of the desired temperature value with a threshold temperature value.

Alternatively, the stand-alone mode may be selected by actuating a switch (not shown) which switches the control system from stand-alone electrical priority mode to stand-alone mode.

In the event that mains supply from the mains power distribution network is available, the control system may be configured to operate in the mains-connected mode (via a synchronization mode) 206 (refer FIG. 2).

Stand-alone Mode Operation

In the stand-alone mode 204 (refer FIG. 2) the control system maintains the same configuration as per the stand-alone electrical priority mode 202 with the exception that the fuel controller 26 is able to control the fuel regulator 20 so as to maintain a desired water temperature in the water tank.

Here, the fuel controller 26 controls the rate at which fuel is consumed by burner 11 so as to maintain a desired temperature in the water storage tank 5 120. The water storage tank 120 holds water which is able to be heated using at least waste heat of the heat engine 10.

The fuel controller 26 receives a temperature error signal from comparator 84 which signal is generated according to a comparison of a sensed temperature signal from transducer 121 located within the water storage tank 120 to a desired temperature value ($T_{des}$). In one form of the invention, the desired temperature value may be set by a home heating system which extracts heat from the water tank. The fuel controller 26 then provides a fuel control signal to the fuel regulator 20 so as to vary the rate at which fuel is consumed by the burner 11. In the preferred embodiment of the invention, the fuel control signal is generated using a fuel control function.

In this respect, in the preferred embodiment of the invention, the fuel control function may be of the form of:

$$K_5 + K_6/s \quad (5)$$

where $K_5$ is a proportional term and $K_6/s$ is an integral term (used to avoid a steady state error which would be unacceptable for fuel control). In an alternative embodiment of the invention, a derivative term ($K_{6a}s$) may also be included, in which case the fuel control function will be in the form of:

$$K_5 + K_6/s + K_{6a}s \quad (6)$$

Although the fuel control function has been described in terms of equations (5) and (6) it is to be understood that other fuel control functions which provide a similar result may be used.

The value of the gains ($K_i$) in equations (5) and (6) may be determined using standard optimization procedures according to the type of response required. In this case, an overdamped response is desirable. Such a response provides a slower response but prevents large overshoots from occurring.

The fuel flow to the heat engine 10 is maintained such that the desired temperature is maintained. However, due to the large thermal mass of the water, the temperature of the water varies quite slowly, hence the response of the fuel control system in terms of being able to maintain the required power requirements by varying the speed of the heat engine is somewhat slow.

Since it is not possible to vary the speed of the heat engine rapidly, significant frequency fluctuations may result as a result of fluctuations in the household load. Advantageously, in the preferred embodiment of the invention, load transients are dealt with by varying the effective resistive load 122 so as to maintain a substantially constant electrical load (that is the combined load of the household load and the dummy load).

Here, excess power is diverted to the dummy load 122 and thus provides 'head room' for increases in the household load (for example, increases which may be caused by 'switching on' a high power electrical appliance). This again is controlled by frequency controller 90.

Hence, as the household load power requirements increase, the excess power which is dissipated in the dummy load is slowly reduced from its desired value until it is zero, at which point the household load power matches the alternator output.

Electrical power which is provided to the dummy load 122 contributes to the heating of water inside a storage tank 120. As has been mentioned previously, the water is also heated by waste heat from the heat engine 10.

If the heat generated is not being utilized, the alternator 100 output will reduce as the fuel controller 26 regulates the supply of fuel to the heat engine 10 so as 15 the regulate hot water temperature. Indeed, this may result in the fuel controller 26 requiring the heat engine to run at less than a minimum allowable fuel setting. In this case, the cogeneration system may revert to a 'shut down' state 208 (refer to FIG. 2), and remain in this state until the temperature of the water returns to a level which requires that the heat engine be restarted. Once the engine has restarted the startup cycle described earlier is repeated.

As is evident from the above description, in the stand-alone mode, to obtain maximum electricity output to the household, it is necessary to ensure that there is sufficient heat load on the hot water system.

Mains Connected Mode

Referring to FIG. 2, prior to switching to the mains-connected mode 206, the output voltage and frequency of the alternator must be synchronized with the corresponding parameters of the mains supply from the mains power distribution network. Thus, prior to switching to mains-connected mode, the control system transitions to a 'synchronize' mode 20 in which the alternator remains isolated from the mains power distribution network via switch 61 (refer FIG. 1).

Referring back to FIG. 1, the synchronization of the alternator output frequency with the frequency of the mains supply from the mains power distribution network entails sensing the frequency of the mains supply and using it to set the desired frequency value. In this way, the frequency of the mains supply is able to be used to control the speed of the heat engine such that alternator 100 has a slightly higher (or lower) frequency than that of the frequency of the supply from the mains power distribution network. For example, if mains supply frequency requires that the alternator have a speed of 1500 rpm, the alternator speed will actually be controlled so as to run at 1502 rpm.

In this way, the frequency of the mains supply from the mains power distribution 5 network and the alternator frequency will synchronize periodically due to the speed difference. At a point of synchronization, switches 61, 63 and 64 are switched to the mains position to thereby connect the unit to the mains power distribution network, thus configuring the cogeneration unit for mains-connected mode. In this mode, power can flow to or from the grid depending upon the cogeneration output and the household load power requirements.

In an alternative embodiment of the invention, a Phase Locked Loop (PLL) controller could be used for the synchronization process.

In the event that the mains supply from the mains power distribution network fails (for example, during a 'black out' or a 'brown out') during the synchronization process, the control system reverts to the 'stand-alone mode' 204 (refer to FIG. 2) and remains in this mode unit the mains supply is available, in which case the control system may revert back to the synchronize mode 210 (refer FIG. 2).

In this mode then, the heating requirements of the body of water determines the amount of power generated by the cogeneration unit by varying the amount of gas supplied to heat engine 10 using the temperature/gas supply control scheme described earlier.

As a consequence of switching switch 63 to the mains position, the field current controller 130 is no longer connected to a voltage feedback loop which includes comparator 82 and voltage controller 22. Instead, the field current controller 130 is connected to a power factor feedback loop which includes comparator 83 and power factor controller 24. Thus, in this mode, the desired power factor $PF_{des}$ is compared with the actual sensed power factor from sensing unit 80 and any difference resulting from this comparison is converted to a power factor error signal which is provided to power factor controller 24. In response to receiving the power factor error signal, the power factor controller 24 uses a 5 power factor control function to generates a power factor control signal which is provided to field current controller 130 to regulate the field winding current in the alternator, and thus the power factor of the alternator output.

The power factor controller 24 may any suitable analogue or a digital controller which is able to use a power factor control function to generate a power factor control signal according to the power factor error signal.

In this respect, in the preferred embodiment of the invention, the power factor control function may be of the form of:

$$K_3 + K_4/s \qquad (7)$$

Where $K_3$ is a proportional term and $K_4/s$ is an integral term (which is used to avoid a steady state error which would be undesirable for power factor control). In an alternative embodiment of the invention, a derivative term ($K_{4a}s$) may also be included, in which case the power factor control function will be in the form of:

$$K_3 + K_4/s + K_{4a}s \qquad (8)$$

Here, $K_3$, $K_4$ and $K_{4a}$ are negative values.

The value of the gains ($K_i$) may be determined using standard optimization procedures according to the type of response required. In this case, an overdamped response is desirable. Such a response provides a slower response but prevents large overshoots from occurring.

Although the power factor control function has been described in terms of equations (7) and (8) it is to be understood that other power factor control functions which provide a similar result may be used:

For the purpose of this description, in FIG. 1 the desired power factor has been represented as $(1-PF)sign_{des}$, and the actual (sensed) power factor has been represented as 1-PF) $sign_{actual}$. In this case, 'sign' is made positive for a leading power factor negative for a lagging power factor. In this respect, the desired power factor will usually be dictated by the mains utility company. Since most mains supplies from mains power distribution grids are lagging, it is often desired that inputs to the mains power distribution network be leading. Thus, in the preferred embodiment of the invention, the desired power factor may be programmable, and thus may be altered when required.

The programming of the desired power factor may be performed remotely (for example, by the mains utility company) using a telephone network (for example, a public switched telephone network, or a public land mobile network), or by other communications network means (for example, via the Internet), or by superimposing desired power factor data onto the mains supply itself.

Whilst in the mains-connected mode 206 (refer to FIG. 2) in the event that the heat engine were to fail, the application of the mains power to the output of the alternator 100 would result in the alternator behaving as a motor. Such behavior would result in a reversal in the direction of the flow of the current on the output side of the alternator 100.

Advantageously, in a preferred form of the invention, the parameter sensing means 80 is able to sense the reversal in the direction of the current. In response to the detection of the current reversal the control system transitions a 'shut down' state 208.

Similarly, in the event that the mains power distribution network was to fail (for example, die to a 'black out' or 'brown out' the control system senses the loss (or degradation) of mains supply (that is, the voltage and frequency of the supply from the mains power distribution network) and in response acts to transfer the operation of the control system to the stand-alone mode 204 (refer FIG. 2). Thus, provided that the power requirements of the household load are less than the output power of the alternator, the supply of AC electricity to the household load will be uninterrupted.

It will thus be recognized that the present invention provides a system and method for generating AC electricity which is suitable for use with a mains power distribution network without relying on an intermediate DC conversion process. Thus, the present invention is able to provide AC electricity without relying on an inverter.

It will also be recognized that the present invention provides a system and method for generating AC electricity which is suitable for use without a mains power distribution network which is able to compensate for fluctuations in an electrical load.

The above has been described with reference to a particular embodiment and it will be understood by the person skilled in the art that many variations and modifications are possible within the scope of the present invention.

Indeed, although the invention has been described in terms of a preferred embodiment which provides control signals which are able to be used to regulate a respective sensed parameter, it will be appreciated that the invention could also be realized in other forms in which each control signal is able to be used regulate multiple sensed parameters, or indeed a form in which one or more control signals are each provided according to multiple sensed parameters.

One suitable form of the invention which may be able to regulate multiple sensed parameters may include a state space controller. Yet another suitable form may include a fuzzy logic controller.

What is claimed is:

1. A control system for a cogeneration unit, the cogeneration unit including a heat engine and an alternator driven by the heat engine, the alternator generating AC electricity for an electrical load, the control system including:
a. parameter sensing means for sensing:
   i. designated parameter(s) of the generated AC electricity; and
   ii. the temperature of a body heated by energy provided by the cogeneration unit;
   the parameter sensing means providing a sensed parameter value for each sensed parameter;
b. for each sensed parameter, a comparator means for comparing a sensed parameter value with a respective desired value, each comparator means being able to provide an error signal according to the difference between the sensed parameter value and the desired value; and
c. each comparator means being coupled to a respective controlling means, each controlling means being capable of using the error signal from the comparator means to provide a control signal, such that each control signal can used to regulate a respective parameter;
wherein the regulation of the designated parameters is performed by controlling characteristics of the alternator, and the regulation of the temperature of the body is performed by controlling fuel supply to the heat engine.

2. A control system for a cogeneration unit according to claim 1 wherein the electrical load includes a household load, the household load being connected to both the alternator and an external AC power source.

3. A control system for a cogeneration unit according to claim 2 wherein the designated parameter is a power factor of the generated AC electricity and the desired value is a desired power factor value.

4. A control system for a cogeneration unit according to claim 3 wherein the desired power factor value is able to be programmed into a programmable device of the control system.

5. A control system for a cogeneration unit according to claim 3 wherein the controlling means for the power factor parameter is a power factor controller, the power factor controller being capable of providing a power factor control signal to a field current controller, the field current controller being coupled to a field winding of the alternator, wherein in response to the power factor control signal the field current controller varies the field current.

6. A control system for a cogeneration unit according to claim 1 wherein the electrical load includes a household load and a dummy load, the household load and the dummy load both being connected to the alternator and not connected to an external AC power source.

7. A control system for a cogeneration unit according to claim 6 wherein the designated parameters are the output voltage and frequency of the generated AC electricity, and the desired values are a desired output voltage value and a desired frequency value.

8. A control system for a cogeneration unit according to claim 7 wherein the controlling means for the output voltage parameter is a voltage controller, the voltage controller being capable of providing a voltage control signal to a field current controller, the field current controller being coupled to a field winding of the alternator, wherein in response to the voltage control signal the field current controller varies the field current of a field winding of the alternator.

9. A control system for a cogeneration unit according to claim 7 wherein the controlling means for the frequency parameter is a frequency controller, the frequency controller being capable of providing a frequency control signal to an electronic switch, such that the electronic switch varies the effective magnitude of the dummy load according to the frequency control signal, wherein the variation of the effective magnitude of the dummy load is able to vary the speed of the alternator.

10. A control system according to claim 9 wherein the electronic switch is a triac.

11. A control system for a cogeneration unit according to claim 6 wherein the dummy load is a resistive element, the resistive element being capable of heating the body.

12. A control system for a cogeneration unit according to claim 1 wherein the controlling means for the temperature parameter is a fuel controller, the fuel controller being capable of providing a fuel control signal to a fuel regulator, such that the fuel regulator varies the fuel supply rate to the heat engine according to the fuel control signal, wherein the variation of the fuel supply varies the energy which is provided to the body.

13. A control system for a cogeneration unit according to claim 12 wherein the body is a body of water which is able to be used in a hydronic heating system.

14. A control system for a cogeneration unit according to claim 13 wherein the desired temperature value is set using the hydronic heating system, wherein the hydronic heating system is capable of dissipating heat obtained from the body.

15. A control system for a cogeneration system according to claim 13 wherein the control system further includes means for controlling the heat dissipation of the hydronic heating system.

16. A control system for a cogeneration unit according to claim 1 wherein the control system further includes a switching means which is operable to select the electrical load type, the electrical load type being selected from:
a. a household load being connected to both the alternator and an external AC power source; and
b. a household load and a controllable dummy load, both not being connected to an external power source.

17. A method for controlling a cogeneration unit, the cogeneration unit including a heat engine and an alternator driven by the heat engine, the alternator generating AC electricity for an electrical load, the method including:
a. sensing parameters, the parameters including:
   i. designated parameter(s) of the generated AC electricity; and
   ii. the temperature of a body heated by energy provided by the cogeneration unit; such that the sensing provides a sensed parameter value for each sensed parameter;
b. comparing a sensed parameter value with a respective desired value, the comparison providing an error signal according to the difference between the sensed parameter value and the desired value; and
c. using the error signal from the comparator means to provide a control signal, such that each control signal being can used to regulate a respective parameter;
wherein the regulation of the designated parameters is performed by controlling characteristics of the alternator, and the regulation of the temperature of the body is performed by controlling fuel supply to the heat engine.

18. A programmed computer for controlling a cogeneration unit, the cogeneration unit including a heat engine and an alternator driven by the heat engine, the alternator generating AC electricity for an electrical load, the programmed computer including software and hardware for:

a. sensing parameters, the parameters including:
   i. designated parameter(s) of the generated AC electricity; and
   ii. the temperature of a body heated by energy provided by the cogeneration unit;
   such that the sensing provides a sensed parameter value for each sensed parameter;
b. comparing a sensed parameter value with a respective desired value, the comparison providing an error signal according to the difference between the sensed parameter value and the desired value; and
c. using each error signal to provide a respective control signal, such that each control signal can be used to regulate a respective parameter;
wherein the regulation of the designated parameters is performed by controlling characteristics of the alternator, and the regulation of the temperature of the body is performed by controlling fuel supply to the heat engine.

19. A programmed computer according to claim 16 wherein the desired values are programmable.

20. A multi-mode control system for a cogeneration unit, the cogeneration unit including a heat engine and an alternator driven by the heat engine, the alternator generating AC electricity for an electrical load, the control system including:
   a. parameter sensing means for sensing:
      i. designated parameter(s) of the generated AC electricity; and
      ii. the temperature of a body heated by energy provided by the cogeneration unit;
      the parameter sensing means providing a sensed parameter value for each sensed parameter, the designated parameters being mode dependent such that in a first mode the designated parameters include the voltage and frequency of the AC electricity and in a second mode the designated parameters include the power factor of the AC electricity;
   b. for each sensed parameter, a comparator means for comparing a sensed parameter value with a respective desired value, each comparator means being able to provide an error signal according to the difference between the sensed parameter value and the desired value; and
   c. each comparator being coupled to a respective controlling means, each controlling means using the error signal from the comparator to provide a control signal, each control signal being used to regulate a respective parameter;
   wherein the regulation of the designated parameters is performed by controlling characteristics of the alternator, and the regulation of the temperature of the body is performed by controlling fuel supply to the heat engine and wherein the mode of the control system is selectable using a switch.

21. A multi-mode control system for a cogeneration unit according to claim 20 wherein in the first mode the cogeneration unit operates independently of an external AC power source, and in the second mode the cogeneration unit operates in conjunction with an external AC power source.

22. A multi-mode control system for a cogeneration unit according to claim 21 wherein in the first mode the electrical load includes a dummy load and a household load.

23. A multi-mode control system for a cogeneration unit according to claim 22 wherein the effective magnitude of the dummy load is controlled by the controlling means associated with controller used to regulate the frequency parameter such that the control of the dummy load is able to be used to regulate the frequency of the AC electricity.

24. A multi-mode control system for a cogeneration unit according to claim 21 wherein in the second mode the electrical load includes a household load.

25. A control system for a cogeneration unit, the cogeneration unit including a heat engine and an alternator driven by the heat engine, the alternator generating AC electricity for an electrical load, the control system including:
   a. parameter sensing means for sensing plural parameters, said plural parameters including designated parameters of the generated AC electricity, the parameter sensing means providing a sensed parameter value for each sensed parameter;
   b. for each sensed parameter, a comparator means for comparing the sensed parameter value with a respective desired value, each comparator means being able to provide an error signal according to the difference between the sensed parameter value and the desired value; and
   c. one or more controlling means, the one or more controlling means being capable of using one or more of the error signals to provide a plurality of control signals, such that each control signal is able to regulate one or more of the sensed parameters;
   wherein the regulation of the sensed parameters is performed by controlling characteristics of the alternator and a temperature of a body heated using energy from the cogeneration unit.

26. A control system for a cogeneration unit according to claim 25 wherein the control system is operable in at least a first and a second mode.

27. A control system according to claim 26 wherein in the first mode the cogeneration unit operates independently of an external AC power source.

28. A control system according to claim 27 wherein the sensed parameters include the temperature of the body.

29. A control system according to claim 27 wherein the designated parameters of the generated AC electricity include:
   a. frequency of the generated AC electricity; and
   b. voltage of the generated AC electricity.

30. A control system according to claim 27 wherein the electrical load includes a dummy load and a household load.

31. A control system according to claim 30 wherein the effective magnitude of the dummy load is controlled by a control signal.

32. A control system according to claim 26 wherein in the second mode the cogeneration unit operates in conjunction with an external AC power course.

33. A control system according to claim 32 wherein the sensed parameters include the temperature of the body.

34. A control system according to claim 32 wherein the designated parameters of the generated AC electricity includes the power factor of the generated AC electricity.

35. A control system according to claim 28 wherein the designated parameters of the generated AC electricity include:
   a. frequency of the generated AC electricity; and
   b. voltage of the generated AC electricity.

36. A control system according to claim 33 wherein the designated parameters of the generated AC electricity includes the power factor of the generated AC electricity.

37. A method for controlling a cogeneration unit, the cogeneration unit including a heat engine and an alternator driven by the heat engine, the alternator generating AC electricity for an electrical load, the control system including:

a. sensing plural parameters, said plural parameters including designated parameters of the generated AC electricity, the sensing providing a sensed parameter value for each sensed parameter;

b. comparing a sensed parameter value with a respective desired value;

c. providing an error signal according to the difference between the sensed parameter value and the desired value; and    d. using one or more of the error signals to provide at least one control signal, such that each control signal is able to regulate one or more of the sensed parameters;

wherein the regulation of the sensed parameters uses the control signals to control characteristics of the alternator and a temperature of a body heated using energy from the cogeneration unit.

38. A control system for a cogeneration unit, the cogeneration unit including a heat engine and an alternator driven by the heat engine, the alternator generating AC electricity for an electrical load, the control system including:

a. Parameter sensing means for sensing:
     i. At least one designated parameter of the generated AC electricity; and    the parameter sensing means providing a sensed parameter value for each sensed parameter;

b. for each sensed parameter, a comparator for comparing a sensed parameter value with a respective desired value and providing an error signal according to the difference between the sensed parameter value and the desired value; and    c. each comparator being coupled to a controller for using a respective error signal to provide a control signal for regulating a respective sensed parameter, such that at least one of the designated parameter control signals is provided to the alternator;

wherein the regulation of said at least one designated parameter is performed by controlling characteristics of the alternator and regulation of the temperature of the body is performed by controlling fuel supply to the heat engine.

39. A control system according to claim 1 wherein the control signal provided to the alternator includes an alternator field winding current control signal.

40. A control system according to claim 2 wherein the designated parameter regulated by the alternator field winding current control signal includes the voltage of the generated AC electricity.

41. A control system according to claim 2 wherein the designated parameter regulated by the field winding current control signal includes the power factor of the generated AC electricity.

42. A method for controlling a cogeneration unit, the cogeneration unit including a heat engine and an alternator driven by the heat engine, the alternator generating AC electricity for an electrical load, the method including:

a. sensing parameters, the sensed parameters including at least one designated parameters of the generated AC electricity and the temperature of a body heated by energy provided by the cogeneration unit such that the sensing provides a sensed parameter value for each sensed parameter;

b. comparing each sensed parameter value with a respective desired value;

c. providing an error signal for each sensed parameter according to the difference between the sensed parameter value and the desired value; and    d. using a respective error signal to provide a control signal for regulating a respective sensed parameter, such that at least one of the designated parameter control signals is provided to the alternator;

wherein the regulation of said at least one designated parameter is performed by controlling characteristics of the alternator and regulation of the temperature of the body is performed by controlling fuel supply to the heat engine.

\* \* \* \* \*